United States Patent
Frederiksen et al.

(10) Patent No.: US 6,859,287 B1
(45) Date of Patent: Feb. 22, 2005

(54) ENHANCED GRAPHICAL ICON APPARATUS AND METHOD FOR DISPLAYING DOCUMENT PLACEMENT AND ORIENTATION

(75) Inventors: Dellas G. Frederiksen, Boise, ID (US); Shizunori S. Kobara, Foster City, CA (US); Dustin Rosing, Sunnyvale, CA (US)

(73) Assignee: Hewlett Packard Development Company, L.P., Houston, TX (US)

(*) Notice: Subject to any disclaimer, the term of this patent is extended or adjusted under 35 U.S.C. 154(b) by 962 days.

(21) Appl. No.: 09/589,991

(22) Filed: Jun. 7, 2000

(51) Int. Cl.[7] .......................... G06F 15/00; G06F 13/00
(52) U.S. Cl. .................... 358/1.12; 358/449; 358/1.18; 358/448; 358/1.5; 382/286; 382/291; 399/81; 399/45; 399/370; 399/376
(58) Field of Search ................. 358/1.12, 449, 358/1.118, 448, 1.5; 382/286, 291; 399/370, 376, 81, 45

(56) References Cited

U.S. PATENT DOCUMENTS

| | | | |
|---|---|---|---|
| 4,682,877 A | * 7/1987 | Fujiwara et al. | 399/86 |
| 4,711,560 A | 12/1987 | Hosaka et al. | 355/14 |
| 5,045,880 A | 9/1991 | Evanitsky et al. | 355/200 |
| 5,159,691 A | * 10/1992 | Fujita | 713/1 |
| 5,621,874 A | 4/1997 | Lucas et al. | 395/761 |
| 5,726,883 A | 3/1998 | Levine et al. | 364/188 |
| 5,801,713 A | 9/1998 | Endo et al. | 345/473 |
| 5,880,727 A | 3/1999 | Barrett et al. | 345/357 |
| 5,905,992 A | 5/1999 | Lucas et al. | 707/514 |
| 5,907,319 A | 5/1999 | Hashimoto et al. | 345/173 |
| 6,115,136 A | * 9/2000 | Tsukamoto et al. | 358/1.18 |
| 6,285,842 B1 | * 9/2001 | Katamoto et al. | 399/81 |
| 6,415,110 B1 | * 7/2002 | Kimura | 399/14 |
| 6,516,178 B2 | * 2/2003 | Fukushima | 399/376 |

* cited by examiner

*Primary Examiner*—Edward Coles
*Assistant Examiner*—Alan Rahimi

(57) ABSTRACT

An enhanced graphical icon system depicting the proper document/paper placement and orientation on the glass or in the auto document feeder for a mopier/copier control panel. The enhanced graphical icon system includes a visual feedback control panel display and an orientation indicator. An original document is accurately described through utilization of original settings button by the automatic detection or manual selection of the appropriate document size, number of sides, page type and page orientation that correspond to the original document. Once the document size is determined, orientation indicator displays to a user the proper location for placing the document, either on the glass or in the ADF, so as to make an accurate copy.

17 Claims, 3 Drawing Sheets

12 US 6,859,287 B1

ENHANCED GRAPHICAL ICON APPARATUS AND METHOD FOR DISPLAYING DOCUMENT PLACEMENT AND ORIENTATION

BACKGROUND OF THE INVENTION

This invention relates to an enhanced graphical icon apparatus and method for displaying document placement and orientation. In particular, this invention relates to an enhanced graphical icon apparatus and method for displaying document placement and orientation in a mopier/copier.

Hewlett-Packard Company ("HP") originally introduced the first "mopier" in 1996. A "mopier" is a new category of network printers optimized to produce multiple original prints (mopies). Mopies are an efficient, low-cost, higher-print-quality alternative to photocopies. Mopiers also have the capability of functioning as traditional copiers do. That is, original documents may be placed on a mopier, as on a copier, for making copies of an original document as opposed to multiple original documents directly from the mopier.

The misplacement and incorrect orientation of paper on the mopier/copier, either on the glass platen or on the auto document feeder ("ADF") may be one of the most common mistakes a user makes in utilization of these machines. Prior art machines, while replete with copying functionalities and static indicators, nevertheless lack any system for providing user feedback on a control panel display as to the correct placement and orientation of a document, once a document size is specified.

Thus, there is a need in the art for providing an enhanced graphical icon for depicting proper document placement and orientation on the glass or in the ADF for mopiers/copiers. It, therefore, is an object of this invention to provide an enhanced graphical icon apparatus and method for displaying proper document placement and orientation once a document size is specified.

SHORT STATEMENT OF THE INVENTION

Accordingly, the enhanced graphical icon apparatus and method of the present invention includes, in a mopier/copier control panel, a visual feedback control panel display and an orientation indicator within the control panel for indicating the proper placement and orientation of a document relative to the mopier/copier once a document size has been detected. In a preferred embodiment, the orientation indicator further includes a platen icon representation of one of a number of locations for possible placement of the document. In a further embodiment, the platen icon representation is selected from one of a group including glass and ADF.

In a further embodiment, the visual feedback control panel further includes a document size selector override for inputting a selected size different from the auto-detected suggestion and resultant indication for placing a document.

In an additional preferred embodiment of the invention, computer program code recorded on a computer readable medium is utilized, for providing in a control panel, an enhanced graphical icon for displaying proper document placement and orientation in a mopier/copier. This embodiment includes computer program code for providing a visual feedback control panel display and computer program code for providing an orientation indicator on the control panel for indicating the proper placement and orientation of a document relative to the mopier/copier once a document size is detected and/or selected.

In a still further embodiment of the present invention, a method of providing an enhanced graphical icon for displaying proper document placement and orientation on a mopier/copier is provided as more particularly set forth and claimed hereafter.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
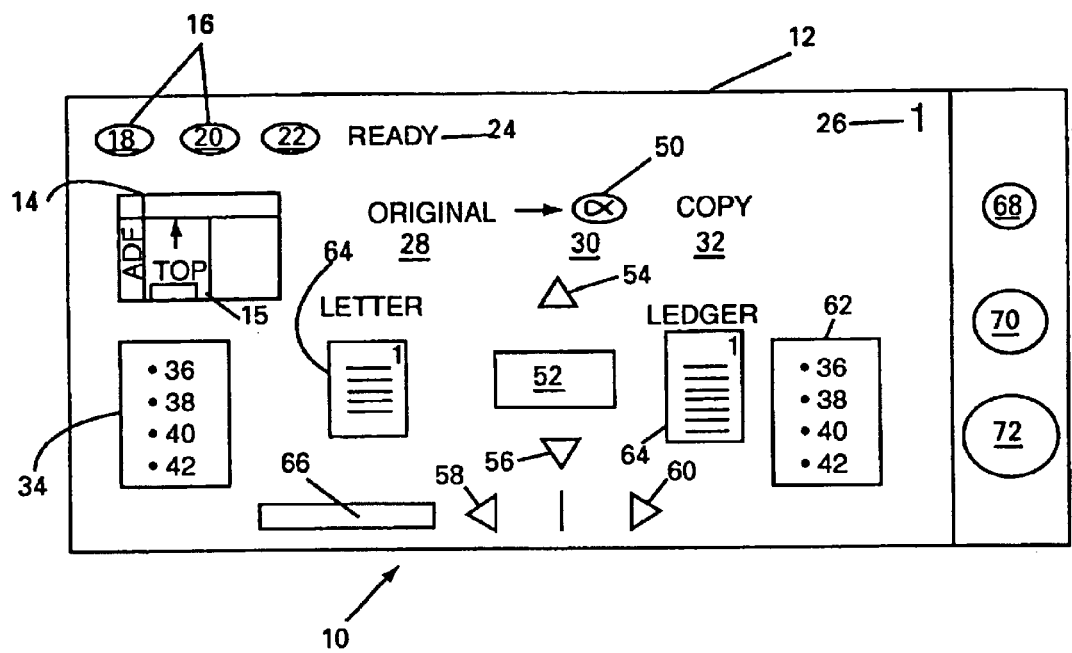
FIG. 1 is a schematic diagram of a preferred embodiment of the enhanced graphical icon system of the present invention illustrating the proper placement of a document of a detected/selected size in the ADF.

The preferred embodiment of the present invention is illustrated by way of example in FIGS. 1–5. With specific reference to FIGS. 1 and 2, enhanced graphical icon system 10 of the present invention includes a visual feedback control panel display 12 and an orientation indicator 14 within the visual feedback control panel 12 for indicating the proper placement and orientation of a document 15 relative to a mopier/copier once a document size is detected/selected, as will be more fully disclosed and described hereafter.

While any appropriate displays may be presented visually on visual feedback control panel display 12, in a preferred embodiment, visual feedback control panel display 12 includes mode buttons 16. Mode buttons 16 include, in a preferred embodiment, send button 18 and utility button 20. Control panel display 12 further includes help button 22, status line 24, and copy count 26.

In a preferred embodiment, enhanced graphical icon system 10 of the present invention is divided into three sections, an "original" section 28 on the left, a "modify" section in the center 30, and a "copy" section 32 on the right of the display.

Original section 28 includes original settings button 34. Original settings button 34 displays the detected/selected original settings, including document size 36, number of sides 38, page type 40 and page orientation 42. Any desired number of original setting options may be provided as now known or hereafter developed. For the purposes of this invention, the critical original setting selection is the document size 36. FIG. 1 illustrates a document of a particular size was detected/selected, in this case a letter sized document. As will be disclosed and described more fully hereafter, FIG. 4 illustrates the comparative change in orientation indicator 14 when a second, in this case larger, sized document is detected/selected in FIG. 3.

Figure 2:
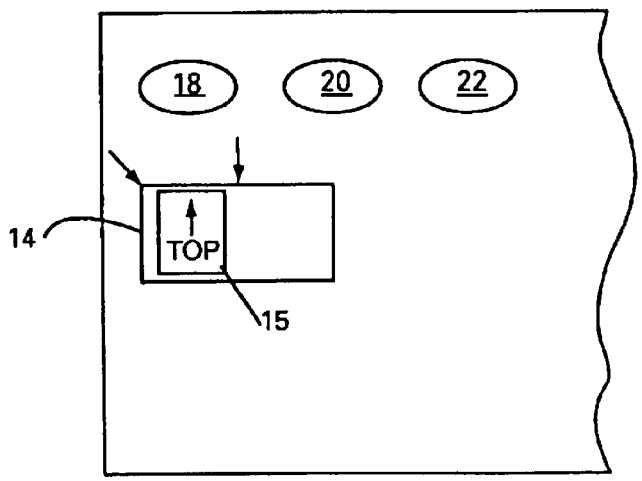
FIG. 2 is a partial schematic diagram as set forth in FIG. 1 illustrating the proper placement of a document of a detected/selected size on the glass.

Referring still to FIGS. 1 and 2, as is known in the art, mopier/copiers have paper sensors which auto-detect if a document 15, paper, is in the ADF or on the glass. These sensors cause orientation indicator 14 to change automatically from an ADF indication as shown in FIG. 1 to a glass icon presentation as shown in FIG. 2. Further, the auto-detect features known in the art detect document size and, in accordance with this invention, once the document size is detected, the proper orientation of the document on the glass or in the ADF is displayed.

Many times, it is necessary to copy irregularly shaped documents and items such as receipts, tickets, and physical objects. The auto-detect features now known will suggest a size for copying. If it is desired to override the automatic sensors known in the art, in a preferred embodiment, the enhanced graphical icon system 10 of the present invention includes a document size selector 36. Document size selector 36 enables a user to override the auto-detect selection and choose a desired "size". Once selected, in accordance with the invention, the proper orientation of the irregular document is displayed as previously discussed.

For the purposes of this invention, ADF is defined to mean any auto document feeder now known or hereafter developed whereby documents 15 are automatically fed into the mopier/copier. Likewise, for the purposes of this invention, "glass" is defined to mean the surface upon which a document 15 is placed for copying. As is known in the art, this surface is typically transparent glass, but can be any surface now known or hereafter developed upon which a document is placed for copying.

Center modify section 30 includes modify button 50 which enables the user to shift, crop, mask, and scale the copy image as desired. Certainly, any additional modification processes now known or hereafter developed are also within the scope of this invention. The size of the copy image is displayed in block 52. The size of the copy image may be enlarged by depressing enlarge button 54 or decreased by depressing reduce button 56. Likewise, the brightness/contrast of the copy image may be adjusted by depressing lighten button 58 or darken button 60.

Referring now to copy section 32, the copy settings can be adjusted by touching or electronically activating copy setting button 62. Copy settings can be adjusted to suit any desired function now known or hereafter developed such as those previously discussed for original settings, i.e. document size 36, number of sides 38, page type 40, page orientation 42 and so forth. Copy settings can be the same as, or different than, the original settings without affecting the orientation indicator 14. That is to say, once the original setting document size selection 36 has been made, either automatically or by override, the document size selection 36 in the copy section 32 may be smaller or larger, but orientation indicator 14 will still provide the user with the appropriate enhanced graphical icon illustrating the proper location of the document 15 on the mopier/copier for proper copying of the document 15.

Further, whatever document size 36 is detected or selected is reflected by graphical document image 64 corresponding to the selected size. As illustrated in FIG. 1, the original document size is "letter" as illustrated by the graphical document image 64 in the original section 28 whereas the copy size is "ledger" as illustrated by the larger graphical document image 64 in the copy section 32.

FIG. 1 also illustrates additional visual feedback control panel display 12 options including scan button 66, reset button 68, stop button 70 and start button 72.

Figure 3:
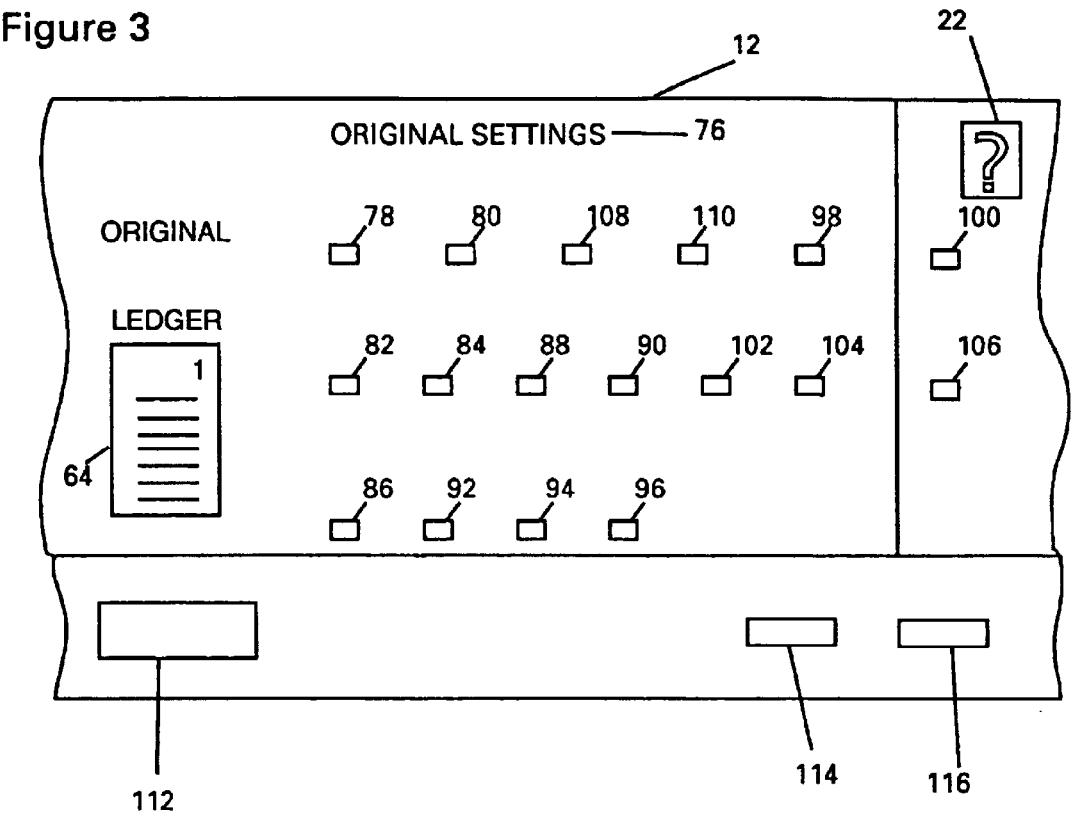
FIG. 3 is a schematic diagram illustrating the options available for selection, including the document size, and showing a change from one size in FIG. 1 to another size in FIG. 3.
Figure 4:
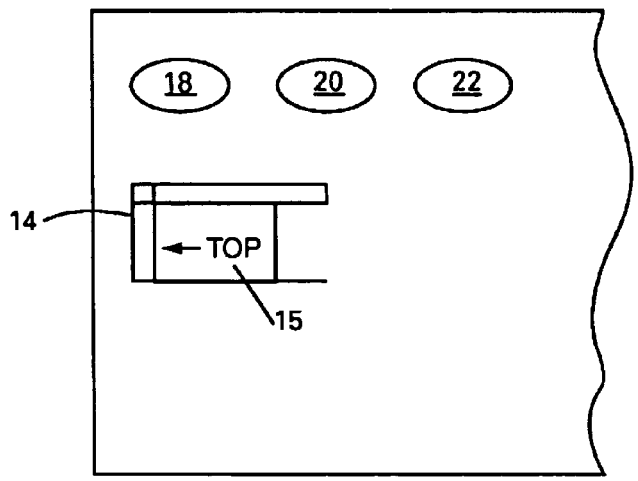
FIG. 4 is a partial schematic diagram of FIG. 1 illustrating the change in required proper document placement and orientation in the ADF compared with FIG. 1 as a result in the change of selection of document size in FIG. 3.

Referring now to FIG. 3, a schematic illustrating the effect of pressing, or electronically selecting, original setting button 34 is depicted. Selecting original settings button 34 causes the schematic in FIG. 3 to be displayed as visual feedback control panel display 12. Visual feedback control panel display 12 in this mode displays the title of the selected area, i.e. "Original Settings" in block 76. Importantly, graphical document image 64 changes to match the selections made by the user. Possible selections include those previously discussed, i.e. document size 36, number of sides 38, page type 40 and page orientation 42, or any other options now known or hereafter developed or desired.

For purposes of illustration, choices illustrated in FIG. 3 are letter size 78, legal size 80, exec size 82, ledger size 84, book 86, A3 88, A4 90, A5 92, B4 94, and B5 96. Number of sides 38 may be one sided 98 or two sided 100. Page type 40 may be text 102, graphic 104, or mixed 106. Page orientation 42 may be portrait 108, or landscape 110. Once again, it should mentioned that any other additional settings that may be desired or are hereafter developed are included within the scope of the invention as contemplated and set forth herein.

In the preferred embodiment, the original setting selections offer all of the possible combinations and permutations an original document 15 can present so that the original document 15 is accurately and fully described by utilization of the original setting button 34. Other visual feedback control panel display 12 buttons that are illustrated in FIG. 3 are help button 22, retrieve document button 112, O.K. button 114, and cancel button 116.

FIG. 4 illustrates the result of the utilization of original setting button 34 to select an original document in ledger size as shown in graphical document image 64 in FIG. 3. This choice is reflected by a change of the orientation indicator 14 in FIG. 1 from the orientation of the paper running vertically, i.e. top to bottom, to an image of the document running horizontally, i.e. left to right in the ADF. In accordance with the invention, the detection or selection of a ledger size document results in a visual aid, orientation indicator 14, illustrating the proper way to place the document so as to ensure it is copied completely the first time without mistake.

In use then, enhanced graphical icon system 10 assists a user in assuring that a document 15 to be reproduced is properly placed on the mopier/copier in the following manner. A user selects an original document 15 to be copied. The original section 28 of enhanced graphical icon system 10 is then accessed by means of operation of original settings button 34. The original document 15 is then accurately defined by the detection and/or selection of document size 36, number of sides 38, page type 40, page orientation 42 and any other appropriate descriptor now known or hereafter developed.

Throughout the description process, graphical document image 64 reflects the multiple settings selected or detected by original settings button 34. After the appropriate document size 36 is selected and/or detected, original orientation indicator 14 provides a graphic illustration of the proper orientation of the selected original document 15 on the mopier/copier for accurate copying.

As previously discussed, and as is known in the art, mopiers/copiers have automatic paper sensors that determine, among other things, document size and whether a document has been placed in the ADF or on the glass. If these are utilized then orientation indicator 14 automatically displays the proper orientation of the document on either the ADF as illustrated in FIG. 1 or the glass as illustrated in FIG. 2.

The user is also enabled to modify the original document in modify section 30 as previously described and to modify the copy in copy section 32. These modifications have no affect on the representation by orientation indicator 14 as to the proper location for placing a document 15 on a mopier/copier. By way of further comparison, FIG. 1 illustrates the proper orientation of a letter sized document 15 by orientation indicator 14 indicating the proper location of the letter size document in the ADF. FIG. 4 illustrates the result of a selection (detection) of ledger button 84 (as illustrated in FIG. 3) resulting in graphical document image 64 in FIG. 3 showing a ledger size image and the resultant different document 15 orientation in FIG. 4 by orientation indicator 14.

By way of a further embodiment of the invention, computer program code is recorded on a computer readable medium for providing, in a control panel, an enhanced graphical icon for displaying proper document placement and orientation in a mopier/copier. The computer program code includes code for providing a visual feedback control panel display as illustrated in the Figures and computer program code for providing an orientation indicator 14 on the control panel 12 for visually depicting the proper placement and orientation of a document 15 relative to the mopier/copier once a document size is selected/detected as previously described. No particular computer program code is required, nor is any particular computer readable medium required. That is to say, persons of ordinary skill in the art of computer programming and recording computer program code on computer readable mediums are fully enabled to practice the invention by means of the specification and drawings set forth herein. Any particular type of computer program code or computer readable medium now known or hereafter developed suffice for the invention.

Figure 5:
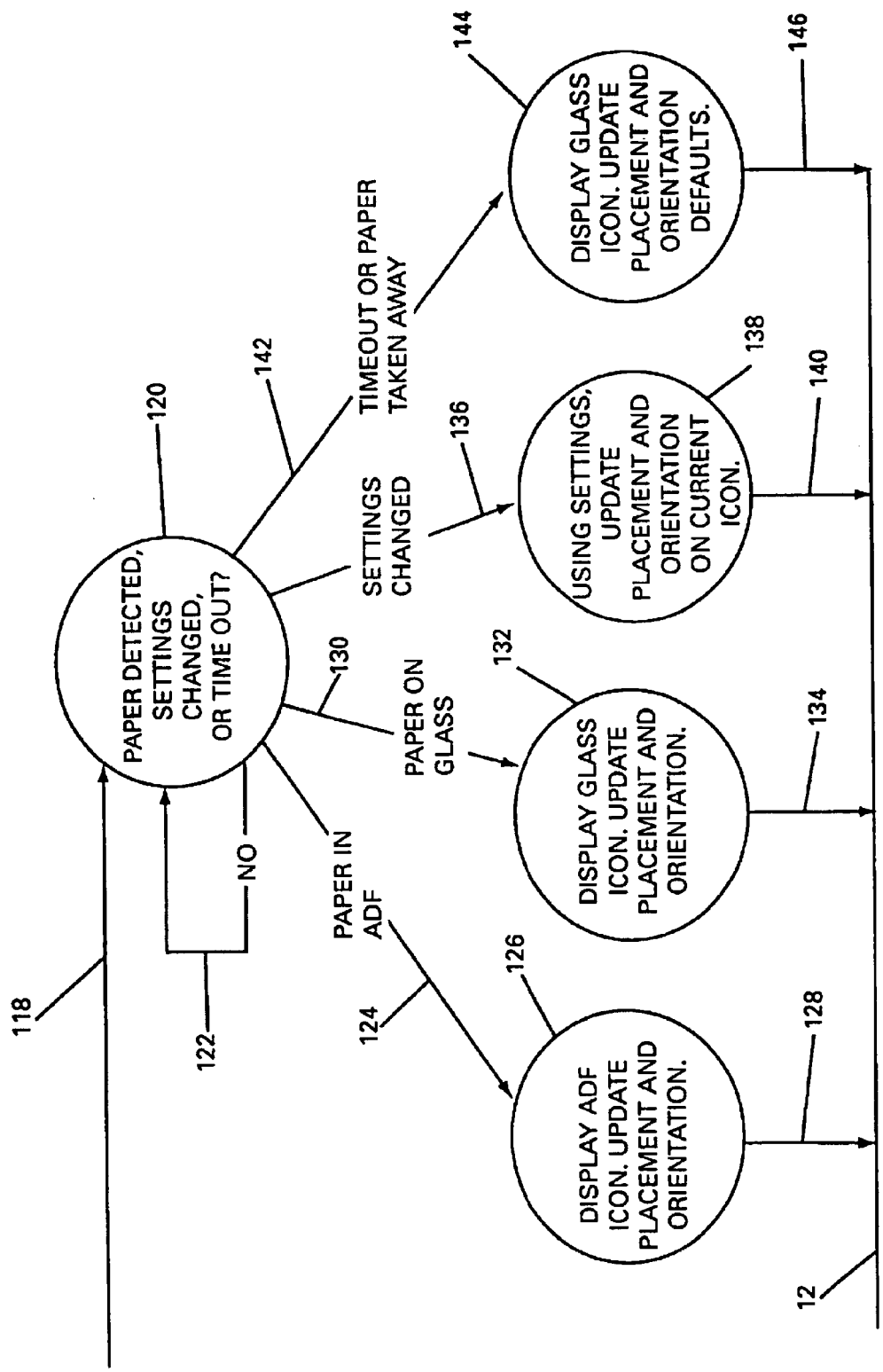
FIG. 5 is a flow diagram illustrating the computer code process of the invention of FIG. 1.

Referring now to FIG. 5, a flow diagram illustrating the functioning of computer code in accordance with the present invention is shown. Assuming that the mopier/copier is turned on and warmed up, input is begun with line 118 and analysis of the input is commenced in circle 120. The analysis in circle 120 consists of computer code determining whether paper or document 15 has been detected, settings have been changed, or the machine is in time out. If the code determines the answer is no, return loop 122 returns the system to the original state prior to input through line 118. If the computer code determines that there is paper in the ADF, code line 124 results in analysis in circle 126. The analysis in circle 126 results in the display of the ADF icon through output code line 128 so that the ADF icon is displayed on control panel 12.

Likewise, if code analysis in circle 120 determines paper/document 15 is on the glass, code line 130 activates analysis circle 132 and the glass icon display is presented through output line 134 to control panel 12.

Similarly, if settings are changed, code line 136 activates circle 138 and the proper settings are displayed via the icon through output 140 to control panel 12. Finally, if the code detects a time out or the removal of paper/document 15 via code line 142, analysis circle 144 displays the default settings through output 146 to display control panel 12.

While the present invention has been disclosed in connection with the preferred embodiment thereof, it should be understood that there may be other embodiments which fall within the spirit and scope of the invention as defined by the following claims.

What is claimed is:

1. In a mopier/copier, computer program code recorded on a computer readable medium for providing in a control panel an enhanced graphical icon for displaying proper document placement and orientation comprising:

(a) computer program code for providing a visual feedback control panel display; and (b) computer program code for providing an orientation indicator on said control panel for providing an image showing the proper placement and orientation of a document relative to said mopier/copier once a document size is determined so as to ensure proper copying and for providing a platen icon representation of one of a plurality of locations for placing said document, said platen icon presentation showing the document placed on said platen icon and oriented so as to ensure proper copying.

2. The invention of claim 1 wherein said computer program code for providing a platen icon representation further comprises computer program code for selecting a platen icon representation from one of a group including glass and auto document feeder.

3. The invention of claim 1 wherein said computer program code for providing a visual feedback control panel display further comprises computer program code for determining document size automatically.

4. The invention of claim 3 wherein said computer program code for providing document size automatically further comprises computer program code for overriding an automatically detected document size.

5. In a mopier/copier control panel, an enhanced graphical icon apparatus for displaying document placement and orientation comprising:

(a) a visual feed back control panel display; and (b) an orientation indicator within said control panel for providing an image of the proper placement and orientation of a document relative to said mopier/copier once a document size is determined so that an accurate and complete copy is made, and for providing a platen icon representation of one of a plurality of locations for placing said document said platen icon representation showing the document on one of said locations and oriented so as to ensure proper copying.

6. The apparatus of claim 5 wherein said platen icon locations further comprise one of a group including glass and auto document feeder.

7. The apparatus of claim 5 wherein said visual feedback control panel further comprises an auto-detect feature for automatically determining document size.

8. The apparatus of claim 7 wherein said auto-detect feature further comprises a manual override for changing the auto-detected document size.

9. In a mopier/copier control panel, an enhanced graphical icon apparatus for displaying proper paper placement and orientation comprising:

(a) a visual feedback control panel display for indicating paper size;

(b) an orientation indicator within said control panel for indicating the proper placement and orientation of the paper relative to said mopier/copier once the paper size is determined;

(c) wherein said visual feedback control panel further comprises an auto-detect device for automatically determining paper size; and (d) wherein said orientation indicator further comprises a platen icon representation of one of a plurality of locations for placing said paper said platen icon showing the paper placed on one of said locations and oriented so as to ensure proper copying.

10. The apparatus of claim 9 wherein said auto-detect device further comprises a manual override for changing the auto-detected paper size.

11. In a mopier/copier with a document platen and a control panel, an enhanced graphical icon method for displaying proper document placement and orientation so as to ensure proper copying comprising the steps of:

(a) providing a visual feedback control panel display for indicating document size;

(b) providing an orientation indicator within said control panel for indicating the proper placement and orientation of a document relative to said mopier/copier after said document size is determined, including providing a platen icon representation of one of a plurality of locations for proper placement of said document; and (c) placing a document on said document platen as shown by the orientation indicator.

12. The method of claim 11 wherein the step of providing a platen icon representation further comprises the step of selecting a platen icon location representation from one of a group including glass and auto document feeder.

13. The method of claim 11 wherein the step of providing a visual feedback control panel further comprises the step of an auto-detect feature for automatically determining document size.

14. The method of claim 13 wherein the step of providing said auto-detect feature further comprises the step of providing a manual override for changing the auto-detected document size.

15. In a mopier/copier, computer program code recorded on a computer readable medium for providing in a control panel an enhanced graphical icon for displaying proper document placement and orientation comprising:

(a) computer program code for providing a visual feedback control panel display; and (b) computer program code for providing an orientation indicator on said control panel for providing an image showing the proper placement and orientation of a document relative to said mopier/copier once a document size is determined so as to ensure proper copying wherein said computer program code for providing an orientation indicator further comprises computer program code for providing a platen icon representation of one of a plurality of locations for placing said document, said platen icon representation showing the document placed on said platen icon and oriented so as to ensure proper copying and wherein said computer program code for providing a platen icon representation further comprises computer program code for selecting a platen icon representation from one of a group including glass and auto document feeder.

16. In a mopier/copier control panel, an enhanced graphical icon apparatus for displaying document placement and orientation comprising:

(a) a visual feed back control panel display; and (b) an orientation indicator within said control panel for providing an image of the proper placement and orientation of a document relative to said mopier/copier once a document size is determined so that an accurate and complete copy is made wherein said orientation indicator further comprises a platen icon representation of one of a plurality of locations for placing said document, said platen icon representation showing the document on one of said locations and oriented so as to ensure proper copying and wherein said platen icon locations further comprise one of a group including glass and auto document feeder.

17. In a mopier/copier with a document platen and a control panel, an enhanced graphical icon method for displaying proper document placement and orientation so as to ensure proper copying comprising the steps of:

(a) providing a visual feedback control panel display for indicating document size;

(b) providing an orientation indicator within said control panel for indicating the proper placement and orientation of a document relative to said mopier/copier after said document size is determined wherein the step of providing an orientation indicator further comprises the step of providing a platen icon representation of one of a plurality of locations for proper placement of said document and wherein the step of providing a platen icon representation further comprises the step of selecting a platen icon location representation from one of a group including glass and auto document feeder; and (c) placing a document on said document platen as shown by the orientation indicator.

* * * * *